(12) United States Patent
Urabe

(10) Patent No.: US 9,418,624 B2
(45) Date of Patent: Aug. 16, 2016

(54) IMAGE OUTPUT APPARATUS, CONTROL METHOD FOR IMAGE OUTPUT APPARATUS, AND PROGRAM

(75) Inventor: Hirofumi Urabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 543 days.

(21) Appl. No.: 13/473,163

(22) Filed: May 16, 2012

(65) Prior Publication Data
US 2012/0299967 A1 Nov. 29, 2012

(30) Foreign Application Priority Data

May 23, 2011 (JP) ................................. 2011-114892
Mar. 16, 2012 (JP) ................................. 2012-060462

(51) Int. Cl.
*G06T 1/20* (2006.01)
*G06T 3/40* (2006.01)
*G06F 15/80* (2006.01)
*G06F 9/38* (2006.01)
*G09G 5/14* (2006.01)
*G09G 5/373* (2006.01)
*G09G 5/38* (2006.01)

(52) U.S. Cl.
CPC ................ *G09G 5/14* (2013.01); *G06F 9/3885* (2013.01); *G06T 1/20* (2013.01); *G06T 3/40* (2013.01); *G09G 5/373* (2013.01); *G09G 5/38* (2013.01); *G06F 15/8007* (2013.01); *G06T 2210/52* (2013.01); *G09G 2340/0421* (2013.01); *G09G 2340/0464* (2013.01); *G09G 2360/06* (2013.01); *G09G 2370/08* (2013.01); *G09G 2380/08* (2013.01)

(58) Field of Classification Search
CPC ......... G06T 1/20; G06T 2210/52; G06T 3/40; G06F 15/8007; G06F 9/3885
USPC ................ 345/505, 660; 382/128; 712/16–22
See application file for complete search history.

(56) References Cited

U.S. PATENT DOCUMENTS

| | | | | |
|---|---|---|---|---|
| 2007/0296874 A1* | 12/2007 | Yoshimoto et al. | ........... | 348/739 |
| 2008/0123918 A1* | 5/2008 | Saotome et al. | ............... | 382/128 |
| 2008/0316229 A1* | 12/2008 | Terayoko | ....................... | 345/660 |
| 2012/0151183 A1* | 6/2012 | Guilford et al. | ................. | 712/22 |

FOREIGN PATENT DOCUMENTS

| | | |
|---|---|---|
| JP | 2006-071938 | 3/2006 |
| JP | 2008-006191 | 1/2008 |

* cited by examiner

*Primary Examiner* — Matthew Salvucci
(74) *Attorney, Agent, or Firm* — Cowan, Liebowitz & Latman, P.C.

(57) ABSTRACT

An image output apparatus, according to the present invention, for outputting images to a display apparatus including an image processing unit capable of performing image quality adjustment processing differently depending on types of images, comprises a selection unit that selects images to be output to the display apparatus according to a user operation, and a control unit that gives a predetermined notice when the number of types of images selected by the selection unit is greater than a maximum adjustable number, which is the number of types of images on which the image processing unit can perform image quality adjustment processing in parallel.

13 Claims, 16 Drawing Sheets

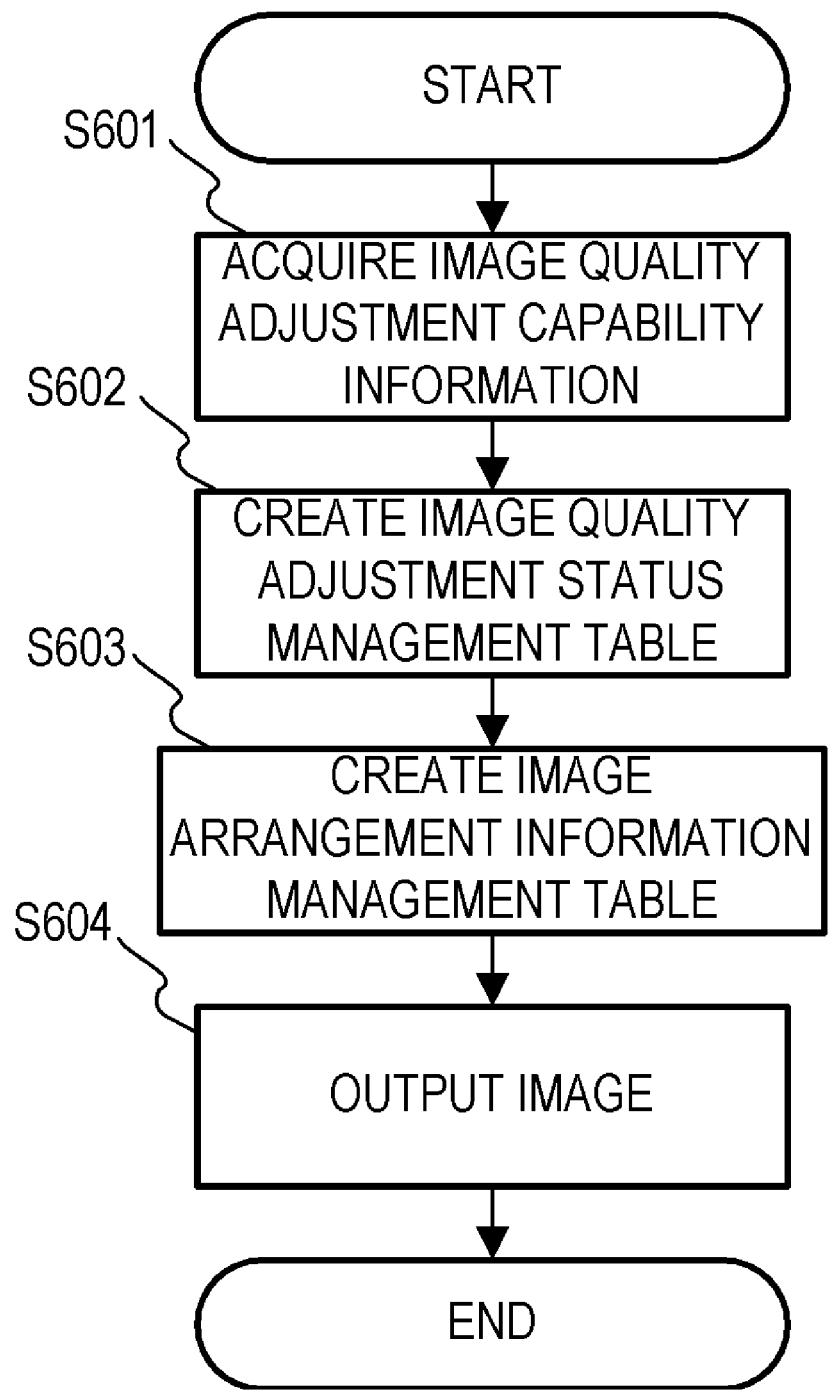

*FIG. 6*

| REGION | STARTING POINT | END POINT |
|---|---|---|
| DIVIDED REGION 201 | (0,0) | (1920,1080) |
| DIVIDED REGION 202 | (1920,0) | (3840,1080) |
| DIVIDED REGION 203 | (0,1080) | (1920,2160) |
| DIVIDED REGION 204 | (1920,1080) | (3840,2160) |

FIG. 7

| REGION | DISPLAY IMAGE |
|---|---|
| DIVIDED REGION 201 | MONOCHROME MEDICAL IMAGE |
| DIVIDED REGION 202 | UNUSED |
| DIVIDED REGION 203 | MONOCHROME MEDICAL IMAGE |
| DIVIDED REGION 204 | UNUSED |

FIG. 8

| DISPLAY IMAGE | STARTING POINT | END POINT |
|---|---|---|
| MONOCHROME MEDICAL IMAGE | (0,0) | (1920,2160) |

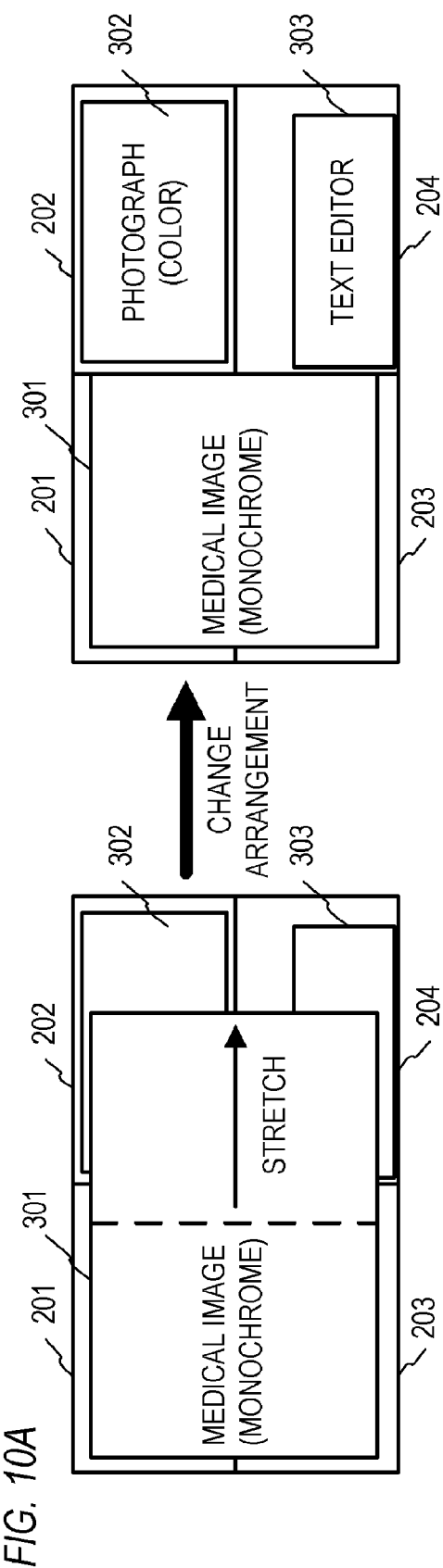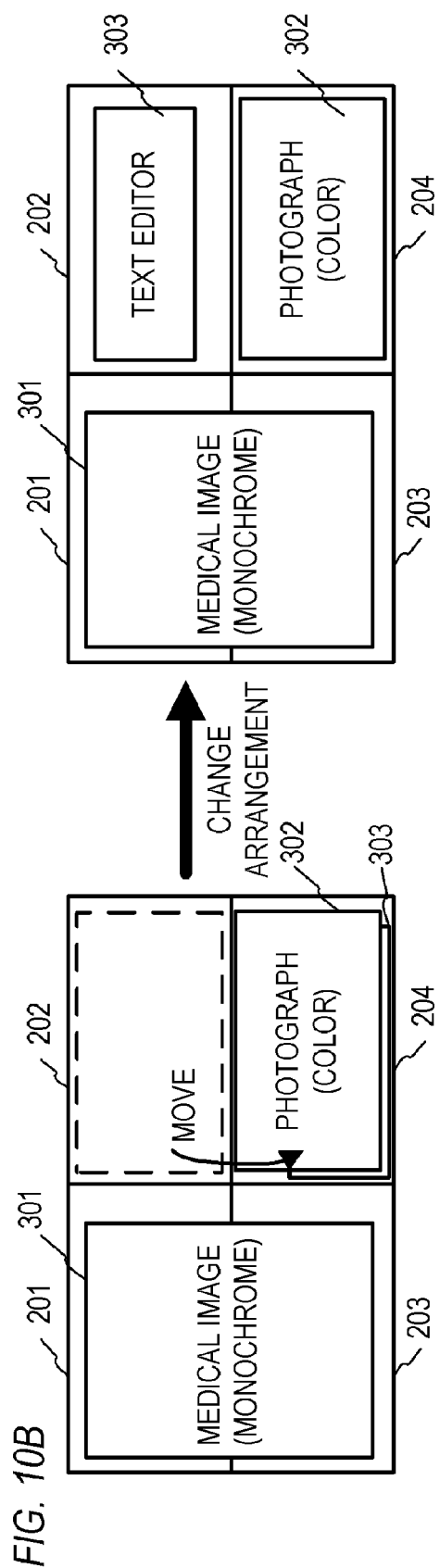

FIG. 11

| REGION | STARTING POINT | END POINT | MAXIMUM ADJUSTABLE NUMBER |
|---|---|---|---|
| DIVIDED REGION 201 | (0,0) | (1920,1080) | 2 |
| DIVIDED REGION 202 | (1920,0) | (3840,1080) | 2 |
| DIVIDED REGION 203 | (0,1080) | (1920,2160) | 2 |
| DIVIDED REGION 204 | (1920,1080) | (3840,2160) | 2 |

FIG. 12

| REGION | DISPLAY IMAGE |
|---|---|
| DIVIDED REGION 201 | IMAGE A, IMAGE B |
| DIVIDED REGION 202 | IMAGE C, IMAGE B |
| DIVIDED REGION 203 | IMAGE D, IMAGE E |
| DIVIDED REGION 204 | IMAGE F, IMAGE G |

FIG. 14

| DISPLAY IMAGE | APPLICABLE PROCESSING |
|---|---|
| FIRST IMAGE | γ CONVERSION PROCESSING, COLOR TEMPERATURE CONVERSION PROCESSING, COLOR CONVERSION PROCESSING |
| SECOND IMAGE | γ CONVERSION PROCESSING, COLOR TEMPERATURE CONVERSION PROCESSING |

*FIG. 15*

| TYPE | REQUIRED IMAGE PROCESSING |
|---|---|
| MONOCHROME IMAGE | γ CONVERSION PROCESSING, COLOR TEMPERATURE CONVERSION PROCESSING |
| COLOR IMAGE | γ CONVERSION PROCESSING, COLOR TEMPERATURE CONVERSION PROCESSING, COLOR CONVERSION PROCESSING |
| OTHER | γ CONVERSION PROCESSING |

IMAGE OUTPUT APPARATUS, CONTROL METHOD FOR IMAGE OUTPUT APPARATUS, AND PROGRAM

BACKGROUND OF THE INVENTION

1. Field of the Invention

The present invention relates to an image output apparatus, a control method for an image output apparatus, and a program.

2. Description of the Related Art

In recent years, pursuant to the advancement of display technology, monitors (display apparatuses) having a display resolution of 3840×2160 pixels or similar levels, and display apparatuses having an image quality adjustment function of applying image quality adjustment processing to images differently depending on the type (gradation characteristic) of image to be displayed are being developed.

A method of performing image processing to high resolution images is disclosed, for example, in Japanese Patent Application Publication No. 2006-71938. With the technology disclosed in Japanese Patent Application Publication No. 2006-71938, the input image is divided into a plurality of divided images, image processing is performed to the plurality of divided images using a plurality of image processing circuits, and the plurality of divided images that were subject to image processing are connected and displayed.

Moreover, there is technology of adjusting the image quality, upon simultaneously displaying a plurality of images on a display apparatus, for each image to be displayed according to the gradation characteristic thereof (for instance, Japanese Patent Application Publication No. 2008-6191).

SUMMARY OF THE INVENTION

However, when performing image quality adjustment processing by using the image quality adjustment function of the display apparatus, there are limits in the number of types of images on which the image quality adjustment processing can be performed in parallel, and in the arrangement of the images on which the image quality adjustment processing can be performed in parallel.

The foregoing limit arises, for instance, from the performance of the image processing circuit (image processing engine) itself which performs the image quality adjustment processing.

Moreover, the foregoing limit also arises by providing a plurality of image processing circuits each of which applies, for each divided region obtained by dividing a region of a screen, image quality adjustment processing to images in that divided region.

For example, considered is the case of a display apparatus including image processing circuits A2, B2 corresponding to divided regions A1, B1 obtained by dividing the region of the screen into two regions of left and right. Let it be assumed that the image processing circuits A2, B2 execute the image quality adjustment processing to one type of image each time. In the foregoing case, the image quality adjustment processing to be performed to one type of image in the divided region A1 and the image quality adjustment processing to be performed to one type of image in the divided region B1 can be performed in parallel. In other words, the number of types of images on which the image quality adjustment processing can be performed in parallel is two (limit in the number of types of images). When displaying two or more types of images, the image quality adjustment processing cannot be performed to all images in parallel. Thus, one or more types of images in which the image quality has not been adjusted (to which appropriate image quality adjustment processing has not been applied) are displayed.

Moreover, with the foregoing display apparatus, when adjusting the image quality of an image that is arranged across the divided regions A1, B1, both image processing circuits A2, B2 need to perform the same image quality adjustment processing. Thus, when an image is arranged as described above, the image quality adjustment processing can only be performed to one type of image. In order to perform two types of image quality adjustment processing to two types of images in parallel, one type of image needs to be arranged in the divided region A1 and the other type of image needs to be arranged in the divided region B1 (limit in the arrangement).

Moreover, the foregoing limit differs for each display apparatus.

Thus, in order to maximize the capability of the display apparatus and perform the image quality adjustment processing in parallel to all images to be displayed, the user needs to be conscious of the number or arrangement of the images to be displayed. The determination of such number or arrangement of images places a burden on the user.

Thus, the present invention provides technology capable of maximizing the capability of the display apparatus and performing the image quality adjustment processing in parallel to all images to be displayed without placing any burden on the user.

The present invention in its first aspect provides an image output apparatus for outputting images to a display apparatus including an image processing unit capable of performing image quality adjustment processing differently depending on types of images, comprising:

a selection unit that selects images to be output to the display apparatus according to a user operation; and a control unit that gives a predetermined notice when the number of types of images selected by the selection unit is greater than a maximum adjustable number, which is the number of types of images on which the image processing unit can perform image quality adjustment processing in parallel.

The present invention in its second aspect provides an image output apparatus for outputting images to a display unit, comprising:

an image processing unit capable of performing image quality adjustment processing differently depending on types of images;

a selection unit that selects images to be output to the display unit according to a user operation; and a control unit that gives a predetermined notice when the number of types of images selected by the selection unit is greater than a maximum adjustable number, which is the number of types of images on which the image processing unit can perform image quality adjustment processing in parallel.

The present invention in its third aspect provides a control method for an image output apparatus for outputting images to a display apparatus including an image processing unit capable of performing image quality adjustment processing differently depending on types of images, comprising:

a selection step of selecting images to be output to the display apparatus according to a user operation; and a control step of giving a predetermined notice when the number of types of images selected in the selection step is greater than a maximum adjustable number, which is the number of types of images on which the image processing unit can perform image quality adjustment processing in parallel.

The present invention in its fourth aspect provides a control method for an image output apparatus including an image processing unit capable of performing image quality adjustment processing differently depending on types of images, comprising:

a selection step of selecting images to be output to a display unit according to a user operation; and a control step of giving a predetermined notice when the number of types of images selected in the selection step is greater than a maximum adjustable number, which is the number of types of images on which the image processing unit can perform image quality adjustment processing in parallel.

The present invention in its fifth aspect provides a non-transitory computer readable medium recording a computer program for causing a computer to perform the control method for an image output apparatus.

According to the present invention, it is possible to maximize the capability of the display apparatus and perform the image quality adjustment processing in parallel to all images to be displayed without placing any burden on the user.

Further features of the present invention will become apparent from the following description of exemplary embodiments with reference to the attached drawings.

BRIEF DESCRIPTION OF THE DRAWINGS

FIG. 5 shows an example of the processing flow of the image output apparatus upon starting the image display;

FIG. 6 shows an example of the image quality adjustment capability information according to Embodiment 1;

FIG. 7 shows an example of the image quality adjustment status management table;

FIG. 8 shows an example of the image arrangement information management table;

FIGS. 10A and 10B show an example of the processing of step S1003 according to Embodiment 1;

FIG. 11 shows an example of the image quality adjustment capability information according to Embodiment 2;

FIG. 12 shows an example of the image quality adjustment status management table;

FIG. 14 shows an example of the limit information according to Embodiment 3; and FIG. 15 shows an example of the determination table according to Embodiment 3.

DESCRIPTION OF THE EMBODIMENTS

The image output apparatus, the control method for an image output apparatus, and the program according to this embodiment are now explained. The image output apparatus according to this embodiment outputs images to a display apparatus.

Embodiment 1

Figure 1:
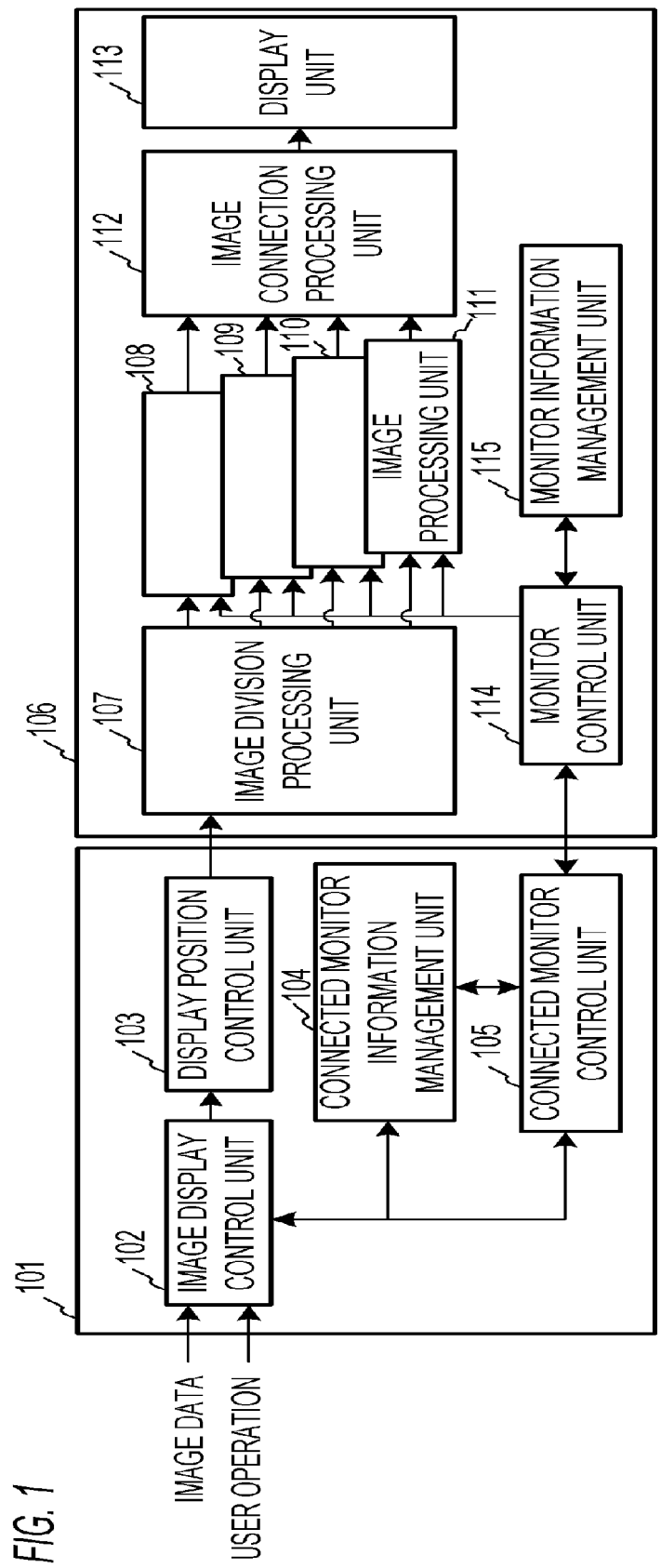
FIG. 1 shows an example of the schematic configuration of the image output apparatus and the display apparatus according to Embodiments 1 to 3.

FIG. 1 shows an example of the schematic configuration of the image output apparatus and the display apparatus according to Embodiment 1 of the present invention.

As shown in FIG. 1, the image output apparatus 101 includes, for example, an image display control unit 102, a display position control unit 103, a connected monitor information management unit 104, and a connected monitor control unit 105. The image output apparatus 101 is a personal computer or the like. Each of the foregoing functional parts is realized, for example, by the CPU of the image output apparatus according to this embodiment executing the programs stored in a memory.

The display apparatus 106 includes, for example, an image division processing unit 107, an image processing unit 108, an image processing unit 109, an image processing unit 110, an image processing unit 111, an image connection processing unit 112, a display unit 113, a monitor control unit 114, and a monitor information management unit 115. The display apparatus 106 is a display apparatus (monitor) including a liquid crystal panel, a plasma panel, an organic EL panel or the like.

The configuration of the image output apparatus 101 is foremost explained.

Signals representing the user operation are input to the image display control unit 102. Specifically, when the user operates the image output apparatus 101 by using a mouse, a keyboard or the like of the image output apparatus 101, signals corresponding to such operation are input to the image display control unit 102.

Moreover, images to be displayed (image data) are input to the image display control unit 102. Specifically, the image display control unit 102 selects the image to be output (image to be displayed) to the display apparatus 106 according to the user operation, and reads the selected image from a recording medium such as a hard disk or a memory card.

The image display control unit 102 sets the display size and the display position of the image to be displayed according to the user operation, and generates display position information which represents the display size and the display position. For example, generated is display position information such as "display on left half of screen" for the image to be displayed according to the user operation.

In addition, the image display control unit 102 decodes the image to be displayed, and outputs the decoded image and its display position information to the display position control unit 103.

Moreover, the image display control unit 102 determines the type of image to be displayed based on the data extension of the image data or the header information in the image data, and generates image identifying information showing the type of that image. Medical image, photo image, text and the like are examples of the type of image. As a type example of a medical image (monochrome image), considered may be an X-ray image, a CT image and the like. As a type image of a photo image (color image), considered may be an endoscopic image, an eye-fundus image and the like. As a type example of a text, considered may be a medical chart, Word text and the like.

In addition, the image display control unit 102 sends the image identifying information and the display position information of the image to be displayed to the connected monitor control unit 105.

Moreover, the image display control unit 102 acquires, from the connected monitor information management unit 104, image quality adjustment capability information representing the image quality adjustment capability of the connected display apparatus. The image quality adjustment capability information is, for example, information representing what kind of image quality adjustment processing can be performed.

The display position control unit 103 is connected to the display apparatus (image division processing unit 107) using an image signal line such as a DVI (Digital Visual Interface). In addition, the display position control unit 103 generates an image in which the image input from the image display control unit 102 is arranged in the region according to the display position information thereof (hereinafter referred to as the "output image"), and outputs the output image to the display apparatus.

The connected monitor information management unit 104 manages monitor information such as the resolution information and the image quality adjustment capability information of the connected display apparatus. The connected monitor information management unit 104 acquires monitor information from the connected monitor control unit 105.

The connected monitor control unit 105 is connected to the display apparatus (monitor control unit 114) by using a data signal line such as USB (Universal Serial Bus), or DDC (Display Data Channel) of DVI. In addition, the connected monitor control unit 105 performs data communication processing so as to communicate data to and from the display apparatus.

Specifically, the connected monitor control unit 105 sends, to the display apparatus, the image identifying information and the display position information input (commanded) from the image display control unit 102. Moreover, the connected monitor control unit 105 sends the monitor information acquisition request from the connected monitor information management unit 104 to the display apparatus, and acquires the monitor information from the display apparatus. In addition, the connected monitor control unit 105 sends the acquired monitor information to the connected monitor information management unit 104. The monitor information acquisition request is a request (signals) that is output so that the connected monitor information management unit 104 can acquire the monitor information.

The configuration of the display apparatus 106 is now explained. The display apparatus according to this embodiment includes an image processing unit (image processing engine; adjustment circuit) capable of performing image quality adjustment processing differently depending on the types of images. Specifically, the display apparatus 106 includes a plurality of image processing units each of which applies, for each divided region obtained by dividing a region of a screen, image quality adjustment processing to images in that divided region. Each image processing unit is configured, for example, from a processor of an LSI (Large Scale Integration) or the like.

The image division processing unit 107 divides the output image that was input from the image output apparatus 101 for each divided region, and outputs the image (divided image) of each of the divided regions to the corresponding image processing unit.

The image processing units 108 to 111 are image processing engines that are associated with each divided region. The image processing units 108 to 111 apply, to the divided image (image of the corresponding divided region) input from the image division processing unit 107, the image quality adjustment processing according to the command (image quality adjustment processing information) from the monitor control unit 114. For example, the image quality adjustment processing is applied to the divided image for causing the image quality to be the image quality of a medical image. Specifically, the γ value is input as the image quality adjustment processing information, and the gradation characteristic of the divided image is converted using the input γ value. For example, DICOM (Digital Imaging and Communication in Medicine)-gamma is applied to a monochrome medical image, gamma 2.2 (γ value=2.2) is applied to a color photo image, and gamma 2.6 (γ value=2.6) is applied to text. In addition, the image processing units 108 to 111 output the divided image to which the image quality adjustment processing is applied, to the image connection processing unit 112. In this embodiment, let it be assumed that one image processing unit performs the image quality adjustment processing to one type of image each time. In other words, in this embodiment, let it be assumed that the maximum adjustable number, which is the number of types of images on which one image processing unit can perform image quality adjustment processing in parallel, is one. The image processing unit can perform the image quality adjustment processing to all images in parallel regardless of the number of images so as long as the type of images is the same. Note that the image quality adjustment processing information is not limited to the γ value. The image quality adjustment processing information will suffice so as long as it is information which represents what kind of image quality adjustment processing is to be performed. For example, the image quality adjustment processing information may include a correction factor for color correction. Specifically, color temperature conversion parameters may be used. For example, an X-ray image and a CT image are both monochrome medical images, but different color temperature conversion parameters are applied (different image quality adjustment processing is performed). Moreover, an endoscopic image and an eye-fundus image are both color photo images, but different color temperature conversion parameters are applied (different image quality adjustment processing is performed). However, if the image processing units 108 to 111 do not perform the color temperature conversion processing, the X-ray image and the CT image will be subject to the same image quality adjustment processing and, therefore, may be treated as having the same type of image. Moreover, if the image processing units 108 to 111 do not perform the color temperature conversion processing, the endoscopic image and the eye-fundus image will be subject to the same image quality adjustment processing and, therefore, may be treated as having the same type of image.

The image connection processing unit 112 connects the divided images that were input from the image processing units 108 to 111 to generate a display image, and outputs the generated display image to the display unit 113.

The display unit 113 is a display unit configured from a liquid crystal panel or the like, and displays the display image input from the image connection processing unit 112.

The monitor control unit 114 determines which part of the output image that was input from the image output apparatus 101 should be displayed at what image quality according to the image identifying information and the image position information input from the image output apparatus 101. In other words, the monitor control unit 114 determines what kind of image quality adjustment processing should be applied to which of the divided images. In addition, the monitor control unit 114 commands the image processing units 108 to 111 to respectively perform the image quality adjustment processing.

For example, when the image identifying information of "monochrome medical image" and the display position information of "display on left half" are input, the monitor control unit 114 determines that the image quality adjustment processing for a monochrome medical image to the left half of the output image that was input from the image output apparatus 101 should be applied. In addition, the monitor control unit 114 outputs a γ value (DICOM-gamma) of the gradation characteristic that is suitable for the gradation characteristic of the monochrome medical image to the image processing unit corresponding to the left half of the output image that was input from the image output apparatus 101 among the image processing units 108 to 111. Moreover, when the image identifying information of "color image" and the display position information of "display on right half" are input, the monitor control unit 114 determines that the image quality adjustment processing for a color photo image to the right half of the output image that was input from the image output apparatus 101 should be applied. In addition, the monitor control unit 114 outputs a γ value (gamma 2.2) of the gradation characteristic that is suitable for the gradation characteristic of the color photo image to the image processing unit corresponding to the right half of the output image that was input from the image output apparatus 101 among the image processing units 108 to 111.

Moreover, the monitor control unit 114 acquires the monitor information from the monitor information management unit 115 according to the monitor information acquisition request from the image output apparatus 101, and outputs the monitor information to the image output apparatus 101.

The monitor information management unit 115 is retaining the monitor information, and sends the monitor information to the monitor control unit 114 according to the request from the monitor control unit 114.

Figure 2:
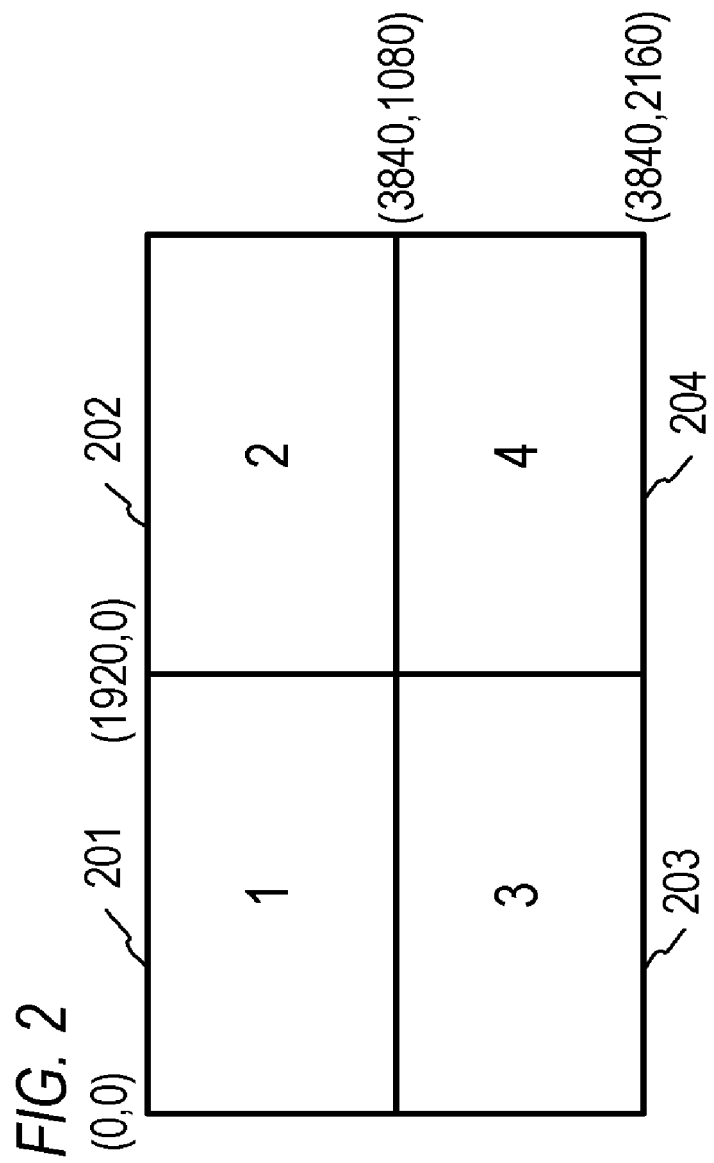
FIG. 2 shows an example of the image division control.

FIG. 2 is a diagram showing an example of the image division control (processing of the image division processing unit 107 and the image processing units 108 to 111).

In the example of FIG. 2, the entire screen has a resolution of 3940×2160 pixels, and the screen is divided into four divided regions 201 to 204 of 1920×1080 pixels.

The image processing unit 108 applies the image quality adjustment processing to the image (divided image 1) in the divided region 201. The image processing unit 109 applies the image quality adjustment processing to the image (divided image 2) in the divided region 202. The image processing unit 110 applies the image quality adjustment processing to the image (divided image 3) in the divided region 203. The image processing unit 111 applies the image quality adjustment processing to the image (divided image 4) in the divided region 204.

Thus, in the example of FIG. 2, the maximum adjustable number of the display apparatus will be four as the sum of the maximum adjustable number of the plurality of image processing units (image processing units 108 to 111). In other words, with the example of FIG. 2, the display apparatus 106 has the capability (image quality adjustment capability) of performing the image quality adjustment processing in parallel to images of up to four types (patterns).

Figure 3A:
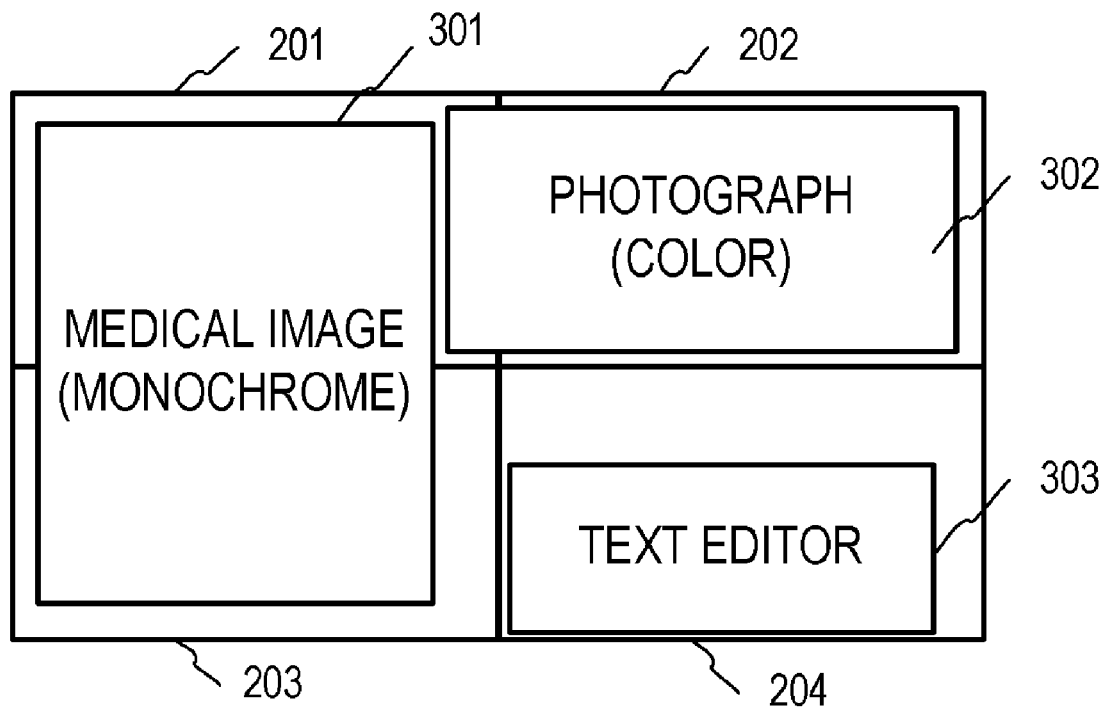
FIGS. 3A and 3B show an example of the output images that are output by the image output apparatus.
Figure 3B:
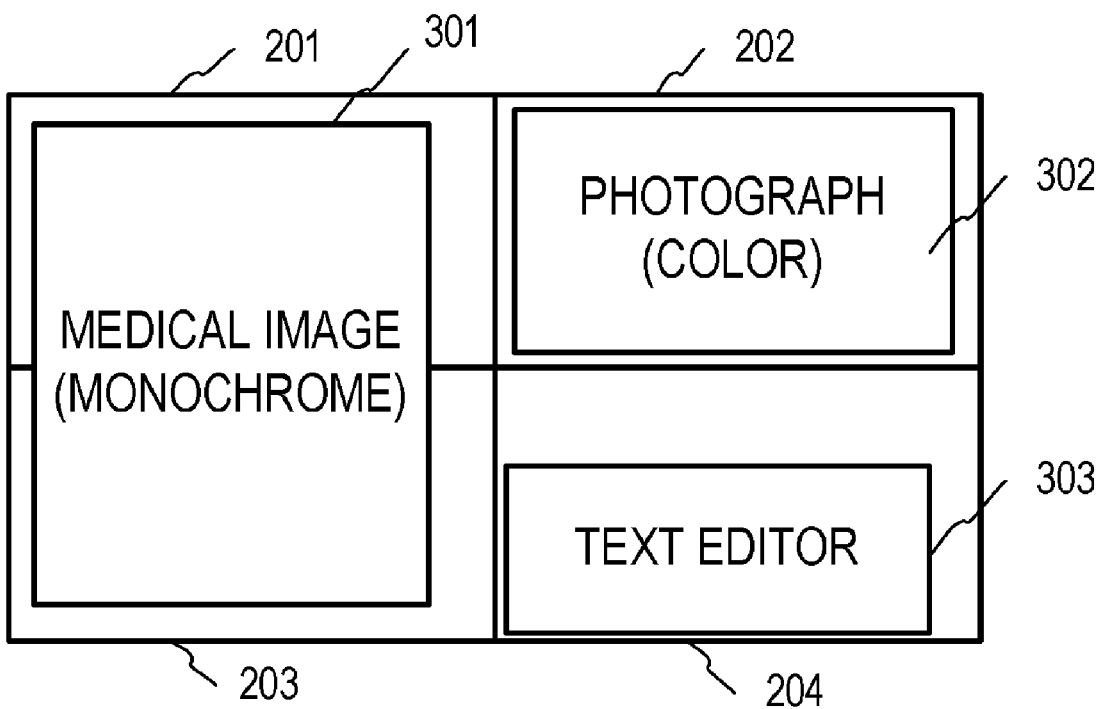

FIGS. 3A and 3B are diagrams showing an example of the output image that is input to the display apparatus 106 (output image that is output by the image output apparatus 101).

The example of FIG. 3A shows a case where an output image containing three (three types of) images; namely, a monochrome medical image 301, a color photo image 302, and a text editor image 303 are input to the display apparatus 106.

The output image of FIG. 3A is divided into the divided regions shown in FIG. 2. The monochrome medical image 301 crosses the divided region 201 and the divided region 203, and the color photo image 302 crosses the divided region 201 and the divided region 202.

In this embodiment, the image quality adjustment processing cannot be performed in parallel to each of the plurality of images in one divided region. Thus, in the example of FIG. 3A, appropriate image quality adjustment processing can be applied to only one of either the monochrome medical image 301 or the color photo image 302 in the divided region 201 (in other words, only one image quality can be adjusted). For example, if the image quality adjustment processing for a monochrome medical image is applied to the image in the divided region 201, the image quality adjustment processing for a monochrome medical image is also applied to the color photo image 302 in the divided region 201. Thus, the image quality of the color photo image 302 is not adjusted. In addition, if the image quality adjustment processing for a color photograph is applied to the image in the divided region 202, the color photo image 302 will be displayed with different image qualities at the portion belonging to the divided region 201 and the portion belonging to the divided region 202.

Moreover, in the example of FIG. 2, since the maximum adjustable number of the display apparatus is four, if an output image containing images of five or more types, one or more types of images in which the image quality is not adjusted will be displayed regardless of the arrangement of the respective images.

Meanwhile, as shown in FIG. 3B, appropriate image quality adjustment processing can be performed to all three images by determining the type and arrangement of the respective images so that a plurality of types of images will not belong to one divided region.

Figure 4A:
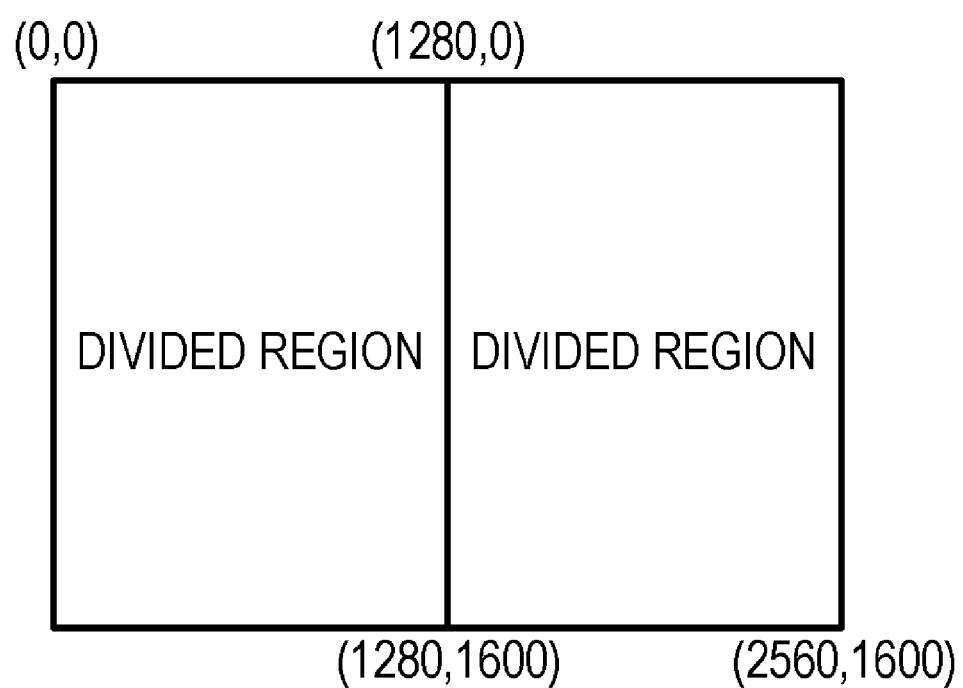
FIGS. 4A and 4B show an example of the image division control.
Figure 4B:
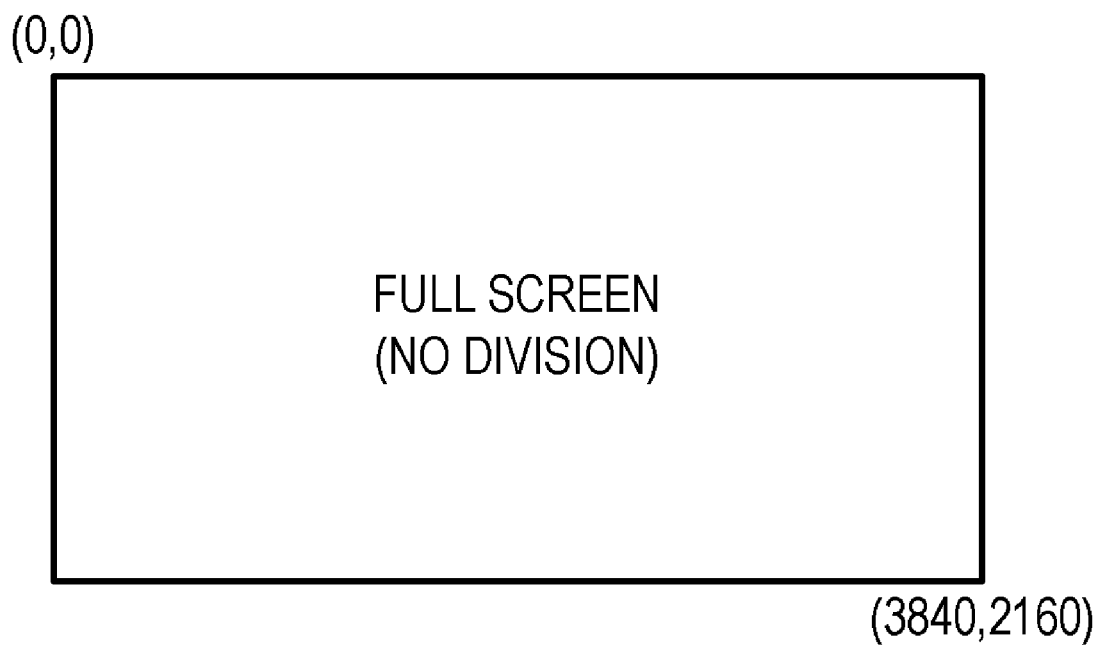

FIGS. 4A and 4B show another example of the image division control.

FIG. 4A shows an example where the screen is divided into two divided regions, and the image quality adjustment processing is performed for each divided region (in other words, an example where two image processing units corresponding to two divided regions are provided). In the foregoing case, the maximum adjustable number of the display apparatus will be two.

The example of FIG. 4B shows a case where the image quality adjustment processing is performed to the full screen without dividing the screen (in other words, a case where one image processing unit corresponding to the entire screen is provided). In the foregoing case, the maximum adjustable number of the display apparatus will be one.

Accordingly, the method of adjusting the image quality (for example, method of dividing the screen) differs for each display apparatus, and the image quality adjustment capability (number of types of images on which the image quality adjustment processing can be performed in parallel, arrangement of images on which the image quality adjustment processing can be performed in parallel) differs for each display apparatus. Thus, in order to perform appropriate image quality adjustment processing in parallel to all images to be displayed, conventionally, the user needed to determine the number of types or the arrangement of images to be displayed in consideration of the image quality adjustment capability of the display apparatus to be used. In this embodiment, the number of types and arrangement of images to be displayed are controlled so as to maximize the image quality adjustment capability of the display apparatus and enable the image quality adjustment processing to be performed in parallel to all images to be displayed without causing the user to engage in the foregoing troublesome operations.

FIG. 5 shows the processing flow of the image output apparatus upon starting the image display.

This flow is started when the user issues a command for starting the display (output) of images to the image output apparatus 101.

A case of arranging a monochrome medical image having a size of 1920×2160 pixels so that the starting point of the image (upper left coordinates of the image) become the uppermost and leftmost coordinates (0, 0) of the screen is now explained.

Foremost, in step S601, the image display control unit 102 acquires, from the connected monitor information management unit 104, the image quality adjustment capability information of the display apparatus (connected monitor) connected to the image output apparatus 101.

FIG. 6 shows an example of the image quality adjustment capability information of the connected monitor. FIG. 6 shows an example of the image quality adjustment capability information in a case where a screen of 3840×2160 pixels is divided into four divided regions of 1920×1080 pixels as shown in FIG. 2.

The image quality adjustment capability information includes information representing each divided region, and the maximum adjustable number of each image processing unit (each divided region). The image quality adjustment capability information of FIG. 6 shows that the divided region 201 is the region from the starting point (0, 0) to the end point (1920, 1080), and the divided region 202 is the region from the starting point (1920, 0) to the end point (3840, 1080). The starting point is the upper left coordinates of the region, and the end point is the lower right coordinates of the region. Moreover, the image quality adjustment capability information of FIG. 6 shows that the divided region 203 is the region from the starting point (0, 1080) to the end point (1920, 2160), and the divided region 204 is the region from the starting point (1920, 1080) to the end point (3840, 2160). The fact that the maximum adjustable number of each image processing unit is not specified in the image quality adjustment capability information of FIG. 6 means that the respective image processing units cannot perform the plurality of types of image quality adjustment processing to the plurality of types of images in parallel (the maximum adjustable number of each image processing unit is one).

Subsequently, in step S602, the image display control unit 102 creates an image quality adjustment status management table which represents what kind of image quality adjustment processing should be applied to the image (divided image) of which divided region based on the image quality adjustment capability information acquired in step S601.

FIG. 7 shows an example of the image quality adjustment status management table. FIG. 7 shows an example of the image quality adjustment status management table in a case where the image quality adjustment capability information of FIG. 6 is acquired.

Four divided regions 201 to 204 are determined from the image quality adjustment capability information acquired in step S601. In addition, a table representing the type of image to be displayed in each divided region is created as the image quality adjustment status management table.

Specifically, in this flow, since a monochrome medical image is displayed in the region from the starting point (0, 0) to the end point (1920, 2160), the image display control unit 102 determines that the monochrome medical image will be displayed in the divided regions 201, 203 based on the image quality adjustment capability information shown in FIG. 6. In addition, the image display control unit 102 creates a table in which the monochrome medical image is assigned to the divided regions 201, 203 as the image quality adjustment status management table.

Here, since there is no image yet to be displayed in the divided regions 202, 204, image quality adjustment processing is not applied to the divided images of the divided regions 202, 204. Thus, the type of image is not assigned to the divided regions 202, 204 of the image quality adjustment status management table.

In addition, in step S603, the image display control unit 102 creates a table (image arrangement information management table) including the display position information representing the arrangement (display size and display position) of the image and the image identifying information.

FIG. 8 shows an example of the image arrangement information management table.

In the example of FIG. 8, the image arrangement information management table includes the types of images to be displayed, and information regarding the starting point and end point thereof. Specifically, the image arrangement information management table of FIG. 8 shows that a monochrome medical image is to be displayed in a region of (0, 0) to (1920, 2160).

Subsequently, in step S604, the image display control unit 102 decodes the monochrome medical image to be displayed. In addition, the image display control unit 102 outputs the decoded monochrome medical image and the display position information to the display position control unit 103, and outputs the image identifying information and the display position information to the connected monitor control unit 105. The display position control unit 103 generates an output image in which the input monochrome medical image is arranged at a position that is represented with the display position information, and outputs the output image to the display apparatus. The connected monitor control unit 105 outputs the image identifying information and the display position information to the monitor control unit 114.

In addition, the monitor control unit 114 commands the image processing unit to perform image quality adjustment processing based on the image identifying information and the arrangement information. Consequently, the image quality of the monochrome medical image is adjusted with the image processing unit, and the monochrome medical image is displayed on the display unit 113. Specifically, when the image quality adjustment capability information of the connected monitor is the information shown in FIG. 6, the monitor control unit 114 commands the image processing units 108, 110 to perform the image quality adjustment processing for a monochrome medical image. Consequently, the image quality of the monochrome medical image is adjusted with the image processing unit 108, 110, and the monochrome medical image is displayed on the display unit 113.

Figure 9A:
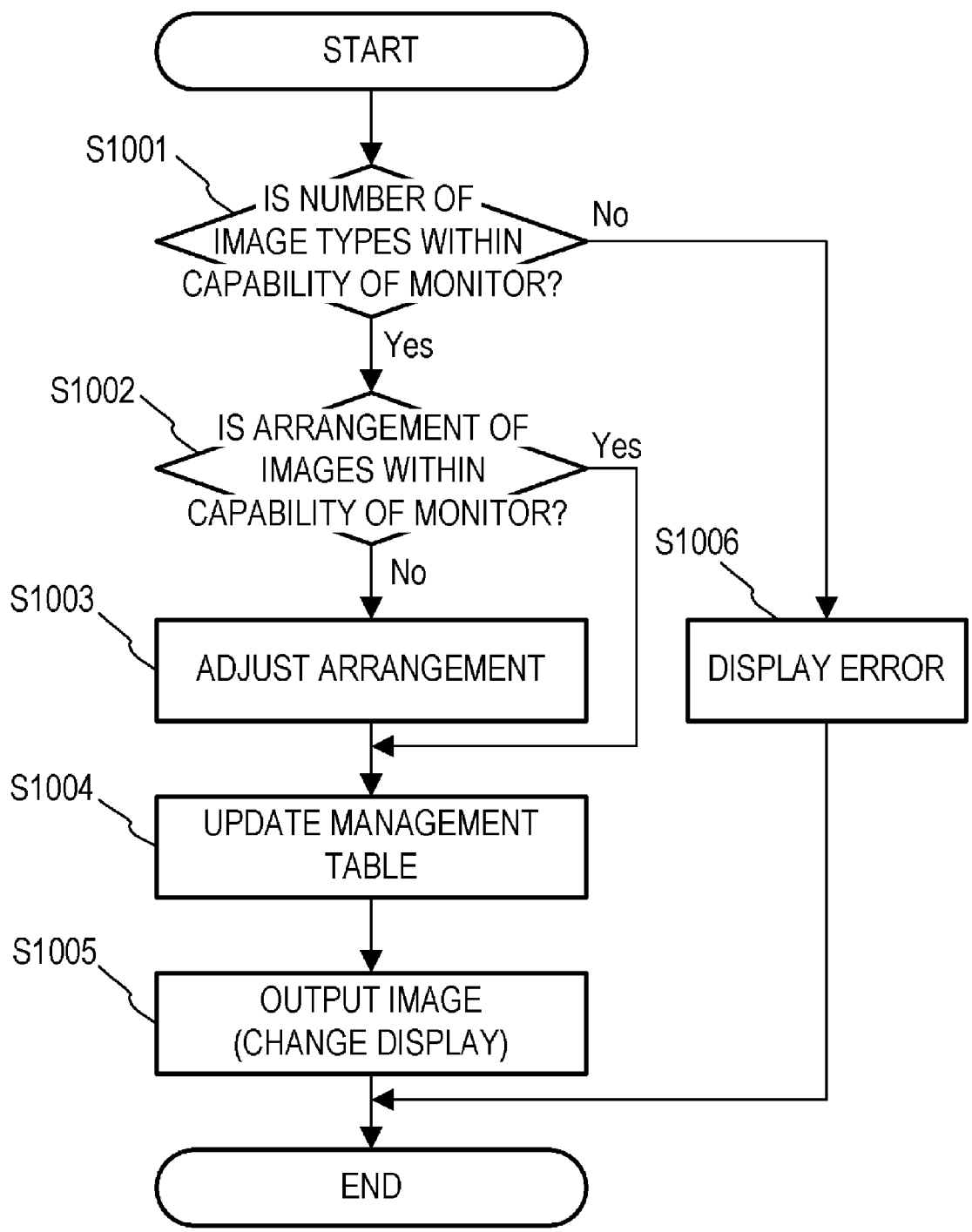
FIGS. 9A and 9B show an example of the processing flow of the image output apparatus when user operation is performed.

FIG. 9A shows the processing flow of the image output apparatus 101 when a user operation is performed.

This flow is started when the user operates the image output apparatus 101, after the image display is started with the flow shown in FIG. 5, to add or change an image to be output to the display apparatus, or change the display size or the display position of the image.

Foremost, in step S1001, the image display control unit 102 determines whether the number of types of the selected images (images to be displayed) is not greater than the maximum adjustable number of the connected monitor (not greater than the sum of the maximum adjustable number of the image processing units of the connected monitor). If the number of types of images to be displayed is not greater than the maximum adjustable number of the connected monitor (step S1001: Yes), the routine proceeds to step S1002. If the number of types of images to be displayed is greater than the maximum adjustable number of the connected monitor (step S1001: No), the routine proceeds to step S1006. Specifically, the routine proceeds to step S1006 when the number of types of images to be displayed becomes greater than the maximum adjustable number of the connected monitor based on the user operation of adding an image to be displayed or changing the image to be displayed.

When the image quality adjustment capability information of the connected monitor is the information shown in FIG. 6, the maximum adjustable number of the connected monitor is four. Thus, the image display control unit 102 determines whether the number of types of images to be displayed is greater than four.

In step S1006, the image display control unit 102 gives a predetermined notice. For example, the image display control unit 102 warns the user that the number of types of images exceeds the maximum adjustable number of the connected monitor. This flow is thereby ended. Specifically, the image display control unit 102 treats the user operation (user operation which resulted in the determination of No in step S1001) as an error, and cancels the selection processing of the image according to that user operation. In addition, the image display control unit 102 creates a message image to the effect that the number of types of images to be displayed exceeds the image quality adjustment capability of the connected monitor, and outputs the message image to the display apparatus 106 via the display position control unit 103. Consequently, the foregoing message image is displayed on the display apparatus 106, and the fact that the number of types of images to be displayed exceeds the image quality adjustment capability of the connected monitor is notified to the user. Note that, if the user tolerates the number of types of images to be displayed to exceed the image quality adjustment capability of the connected monitor, it is also possible to display the images selected by the user as a result of not adjusting the image quality according to the number of types of images. In other words, the same image quality adjustment can be performed to a plurality of types of images.

In step S1002, the image display control unit 102 determines whether the arrangement (display size and display position) of the images is set so that the number of types of images to be displayed in one divided region is not greater than the maximum adjustable number (one in this embodiment) of the image processing unit corresponding to that divided region. If the number of types of images to be displayed in one divided region is not greater than the maximum adjustable number of the image processing unit corresponding to that divided region (step S1002: Yes), the routine proceeds to step S1004. If the number of types of images to be displayed in one divided region is greater than the maximum adjustable number of the image processing unit corresponding to that divided region (step S1002: No), the routine proceeds to step S1003. Specifically, the routine proceeds to step S1003 when the number of types of images to be displayed in one divided region becomes greater than the maximum adjustable number of the image processing unit corresponding to that divided region due to the user operation of determining the arrangement of the added image to be displayed or changing the arrangement of the image to be displayed.

In step S1003, the image display control unit 102 changes either the display size or the display position, or both of the display size and the display position of the image that was set so that the number of types of images to be displayed in each divided region is not greater than the maximum adjustable number of the image processing unit corresponding to that divided region. The routine thereafter proceeds to step S1004.

An example of the processing of step S1003 is now explained with reference to FIGS. 10A and 10B.

FIG. 10A shows a case where the user operation of stretching the width of the monochrome medical image (width of the display region of the monochrome medical image) to the right (to the side of the divided region 202) from the state shown in FIG. 3B is performed.

Here, in step S1002, when the image display control unit 102 performs the processing according to the user operation, it determines that the arrangement of the images exceeds the image quality adjustment capability of the connected monitor since two images are respectively contained in the divided regions 202, 204.

In addition, in step S1003, the image display control unit 102 uses the image quality adjustment capability information of the connected monitor and changes the foregoing user operation (stretching operation of the image) to a stretching operation up to a position where the arrangement of the image will not exceed the image quality adjustment capability. In the example of FIG. 10A, the stretching operation up to the inside of the divided regions 202, 204 is changed to the stretching operation up to the boundary of the divided regions 201, 203 and the divided regions 202, 204.

FIG. 10B shows a case where the user operation of moving the display position of the color photo image 302 to the inside of the divided region 204 from the inside of the divided region 202 from the state of FIG. 3B is performed.

Here, in step S1002, when the image display control unit 102 executes the processing according to the user operation, it determines that the arrangement of the images exceeds the image quality adjustment capability of the connected monitor since two images are contained in the divided region 204.

In addition, in step S1003, the image display control unit 102 moves the image that is already being displayed in the destination of the display position of the image according to the user operation into the divided region which will no longer contain any image due to the user operation (moving the display position of the image). In the example of FIG. 10B, the display position of the text editor image that was displayed in the divided region 204 is moved inside the divided region 202.

Note that FIGS. 10A and 10B are merely an example, and the display size and/or display position of the image can be changed in any way if the number of types of images to be displayed in each divided region becomes the number is not greater than the maximum adjustable number of the image processing unit corresponding to that divided region.

In step S1004, the image display control unit 102 updates the image quality adjustment status management table and the image arrangement information management table based on the user operation or the change result in step S1003.

In addition, in step S1005, the image display control unit 102 decodes the image to be displayed and outputs the decoded image and its display position information to the display position control unit 103. Moreover, the image display control unit 102 outputs the image identifying information and the display position information to the connected monitor control unit 105. The display position control unit 103 generates an output image in which the input image is arranged at a position that is represented in the display position information, and outputs the output image to the display apparatus. The connected monitor control unit 105 outputs the image identifying information and the display position information to the monitor control unit 114. The number and arrangement of the images to be displayed are thereby updated (display change). Moreover, all images to be displayed are displayed as a result of the appropriate image quality adjustment processing being applied in the connected monitor.

Figure 9B:
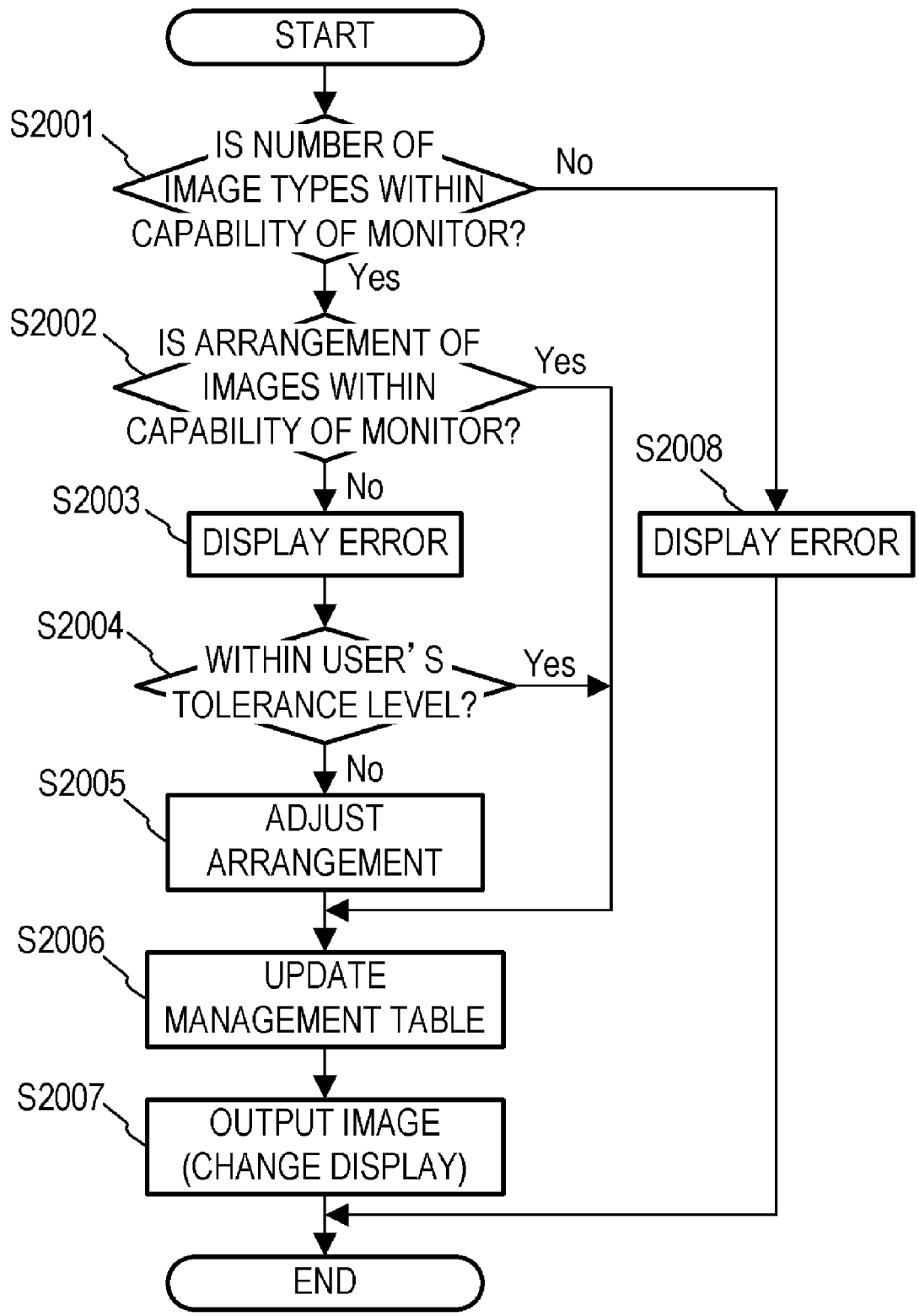

Note that, as a modified example of FIG. 9A, the processing flow shown in FIG. 9B may also be adopted. Steps S2001 and S2002 of FIG. 9B are the same as steps S1001 and S1002 of FIG. 9A. Steps S2005 to S2008 of FIG. 9B are the same as steps S1003 to S1006 of FIG. 9A.

In step S2002, if the number of types of images to be displayed in one divided region is greater than the maximum adjustable number of the image processing unit corresponding to that divided region (step S2002: No), the routine proceeds to step S2003. Specifically, the routine proceeds to step S2003 if the number of types of images to be displayed in one divided region becomes greater than the maximum adjustable number of the image processing unit corresponding to that divided region due to the user operation of determining the arrangement of the added image to be displayed or changing the arrangement of the image to be displayed.

In step S2003, the image display control unit 102 warns the user since the number of types of images to be displayed in one divided region is greater than the maximum adjustable number of the image processing unit corresponding to that divided region. Specifically, the image display control unit 102 treat the user operation as an error and creates a message image to the effect that the arrangement of the images exceeds the image quality adjustment capability of the connected monitor, and outputs the message image to the display apparatus 106 via the display position control unit 103. Consequently, the foregoing message image is displayed on the display apparatus 106, and the fact that the arrangement of the images exceeds the image quality adjustment capability of the connected monitor is notified to the user.

In addition, when the routine proceeds to step S2004 and the user does not tolerate the arrangement of the images to exceed the image quality adjustment capability of the connected monitor (step S2004: No), the routine proceeds to step S2005.

Meanwhile, if the user tolerates the arrangement of the images to exceed the image quality adjustment capability of the connected monitor (step S2004: Yes), the routine proceeds to step S2006. In the foregoing case, for instance, if a plurality of types of images coexist in one divided region, the γ value corresponding to the image with the largest area among the plurality of types of images is selected. In the example shown in FIG. 10A, when the monochrome medical image is larger than the color photo image in the divided region 202, the DICOM-gamma corresponding to the monochrome medical image is applied to the monochrome medical image and the color photo image in the divided region 202. If the monochrome medical image is smaller than the color photo image in the divided region 202, the gamma 2.2 corresponding to the color photo image is applied to the monochrome medical image and the color photo image in the divided region 202. Moreover, if the monochrome medical image is larger than the text editor image in the divided region 204, the DICOM-gamma corresponding to the monochrome medical image is applied to the monochrome medical image and the text editor image in the divided region 204. If the monochrome medical image is smaller than the text editor image in the divided region 204, the gamma 2.6 corresponding to the text editor image is applied to the monochrome medical image and the text editor image in the divided region 204. Note that if one type of image crosses a plurality of divided regions, the gamma processing corresponding to the image may be applied to that image. Specifically, the DICOM-gamma may be applied to all divided regions 201 to 204 displaying the monochrome medical image.

As described above, according to this embodiment, the number of types and arrangement of the images to be displayed are controlled so as to maximize the image quality adjustment capability of the display apparatus and enable the image quality adjustment processing to be performed in parallel to all images to be displayed. Consequently, it is possible to maximize the capability of the display apparatus and perform the image quality adjustment processing in parallel to all images to be displayed without placing any burden on the user. Specifically, the trouble of the user having to determine the number of types and arrangement of the images to be displayed while considering the image quality adjustment capability of the display apparatus to be used can be eliminated. The user-friendliness is thereby improved.

Note that this embodiment adopted a configuration where the image output apparatus acquires the monitor capability information from the display apparatus, this embodiment is not limited to the foregoing configuration. The monitor capability information may be stored in the image output apparatus in advance, or acquired from a device other than the connected monitor. For example, the monitor capability information may be acquired from the internet (from the manufacturer's site or the like). Moreover, a configuration of integrating the image output apparatus and the display apparatus (configuration where all functional blocks of the display apparatus 106 are built into the image output apparatus) may also be adopted. Moreover, a configuration where the functional blocks other than the display unit 113 of the display apparatus 106 are built into the image output apparatus, and the image output apparatus is connected to the display unit 113 may also be adopted.

Note that, although this embodiment adopted a configuration of conducting various determinations (for instance, the determinations in steps S1001 and 1002) by using the number of types of images to be displayed, the foregoing determinations may also be conducted by using the number of images to be displayed. For example, in step S1001, whether the number of selected images is not greater than the maximum adjustable number of the connected monitor may be determined. In other words, the number of types of the selected images may be determined to be greater than the maximum adjustable number of the connected monitor when the number of selected images is greater than the maximum adjustable number of the connected monitor. Moreover, in step S1002, whether the arrangement of the images has been set so that the number of images to be displayed in one divided region is not greater than the maximum adjustable number of the image processing unit corresponding to that divided region may be determined. Consequently, it is possible to simplify the foregoing determination processing, and thereby alleviate the processing load.

Note that, in this embodiment, the number of types and arrangement of the images to be displayed were controlled, but it is also possible to control only one of the above. Even with such a configuration, it is possible to yield effects in accordance with the foregoing effects. Moreover, when only the number of types of images to be displayed is controlled, the image quality adjustment capability information may be information containing only the maximum adjustable number of the display apparatus.

Embodiment 2

Embodiment 2 explains a case where the maximum adjustable number of each image processing unit is two or more. In other words, in this embodiment, one image processing unit can perform image quality adjustment processing to a plurality of types of images in parallel.

Note that, since the configuration of the image output apparatus and the display apparatus according to Embodiment 2 is the same as the configuration of Embodiment 1 (FIG. 1), the explanation thereof is omitted.

The processing flow of the image output apparatus upon starting the image display is explained with reference to FIG. 5.

Foremost, in step S601, the image display control unit 102 acquires, from the connected monitor information management unit 104, the image quality adjustment capability information of the display apparatus (connected monitor) connected to the image output apparatus 101.

FIG. 11 shows an example of the image quality adjustment capability information according to this embodiment. FIG. 11 shows an example of the image quality adjustment capability information in a case where a screen of 3840×2160 pixels is divided into four divided regions of 1920×1080 pixels as shown in FIG. 2. Moreover, FIG. 11 shows an example of the image quality adjustment capability information when the maximum adjustable number of each image processing unit (each divided region) is two.

The image quality adjustment capability information of FIG. 11 shows that the divided region 201 is the region from the starting point (0, 0) to the end point (1920, 1080), and the divided region 202 is the region from the starting point (1920, 0) to the end point (3840, 1080). Moreover, the image quality adjustment capability information of FIG. 11 shows that the divided region 203 is the region from the starting point (0, 1080) to the endpoint (1920, 2160), and the divided region 204 is the region from the starting point (1920, 1080) to the endpoint (3840, 2160). Moreover, the image quality adjustment capability information of FIG. 11 shows that the maximum adjustable number of each divided region is two.

Subsequently, in step S602, the image display control unit 102 creates an image quality adjustment status management table based on the image quality adjustment capability information acquired in step S601.

FIG. 12 shows an example of the image quality adjustment status management table. FIG. 12 shows an example of the image quality adjustment status management table in a case where the image quality adjustment capability information of FIG. 11 is acquired.

Four divided regions 201 to 204 are determined from the image quality adjustment capability information acquired in step S601. Moreover, it is determined that the maximum adjustable number of each divided region is two. In addition, a table representing the type of image to be displayed in each divided region is created as the image quality adjustment status management table. Specifically, a table in which images A and B are assigned to the divided region 201, images C and B are assigned to the divided region 202, images D and E are assigned to the divided region 203, and images F and G are assigned to the divided region 204 is created as the image quality adjustment status management table. Note that the images A to G are different types of images, respectively.

Since the processing of step S603 onward is the same as Embodiment 1, the explanation thereof is omitted.

The processing flow during the image display operation is explained with reference to FIG. 9A.

Foremost, in step S1001, the image display control unit 102 determines whether the number of types of the selected images (images to be displayed) is not greater than the maximum adjustable number of the connected monitor. If the number of types of images to be displayed is not greater than the maximum adjustable number of the connected monitor (step S1001: Yes), the routine proceeds to step S1002. If the number of types of images to be displayed is greater than the maximum adjustable number of the connected monitor (step S1001: No), the routine proceeds to step S1006.

When the image quality adjustment capability information of the connected monitor is the information shown in FIG. 11, the maximum adjustable number of the connected monitor is eight as the sum of two as the maximum adjustable number of the four image processing units of the connected monitor. Thus, the image display control unit 102 determines whether the number of types of images to be displayed is greater than eight.

In step S1006, the image display control unit 102 treats the user operation as an error, and cancels the selection processing of the image according to that user operation. In addition, the image display control unit 102 creates a message image to the effect that the number of types of images to be displayed exceeds the image quality adjustment capability of the connected monitor, and outputs the message image to the display apparatus 106 via the display position control unit 103. Consequently, the foregoing message image is displayed on the display apparatus 106, and the fact that the number of types of images to be displayed exceeds the image quality adjustment capability of the connected monitor is notified to the user.

In step S1002, the image display control unit 102 determines whether the arrangement of the images is set so that the number of types of images to be displayed in one divided region is not greater than two as the maximum adjustable number of the image processing unit corresponding to that divided region. If the number of types of images to be displayed in one divided region is not greater than two (step S1002: Yes), the routine proceeds to step S1004. If the number of types of images to be displayed in one divided region is greater than two (step S1002: No), the routine proceeds to step S1003.

In step S1003, the image display control unit 102 changes either the display size or the display position, or both of the display size and the display position of the image that was set so that the number of types of images to be displayed in each divided region is not greater than two. The routine thereafter proceeds to step S1004.

An example of the processing of step S1003 is now explained with reference to FIGS. 13A and 13B.

Figure 13A:
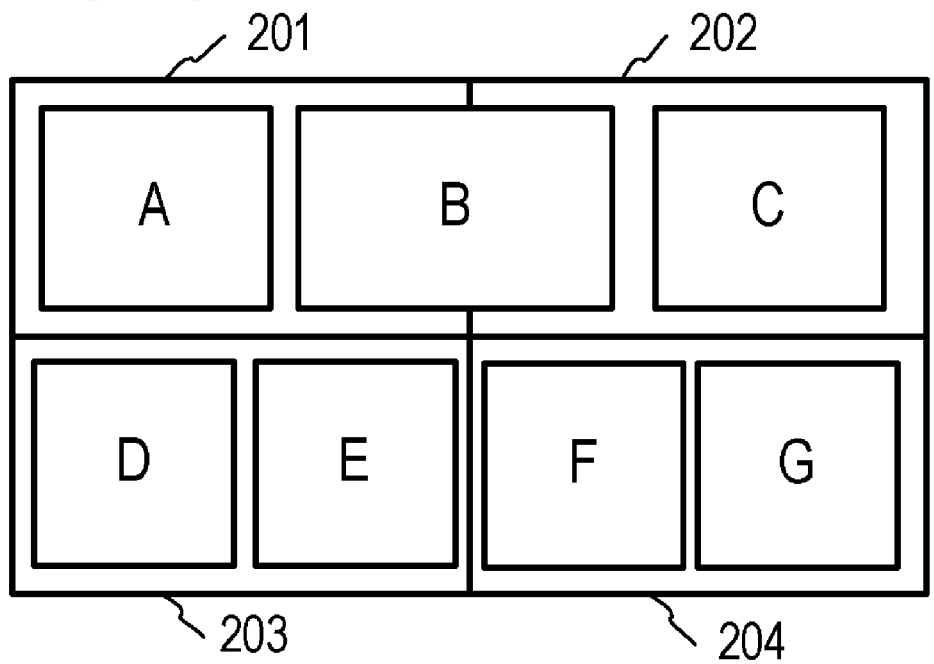
FIGS. 13A and 13B show an example of the processing of step S1003 according to Embodiment 2.

FIG. 13A shows a display example where seven (seven types of) images; namely, images A, B, C, D, E, F, and G, are displayed, and the image B is displayed across the divided region 201 and the divided region 202. In the example of FIG. 13A, since the number of types of images to be displayed in each divided region is two, image quality adjustment processing can be performed to all images in parallel. In other words, all images can be display by applying the appropriate image quality adjustment processing.

Figure 13B:
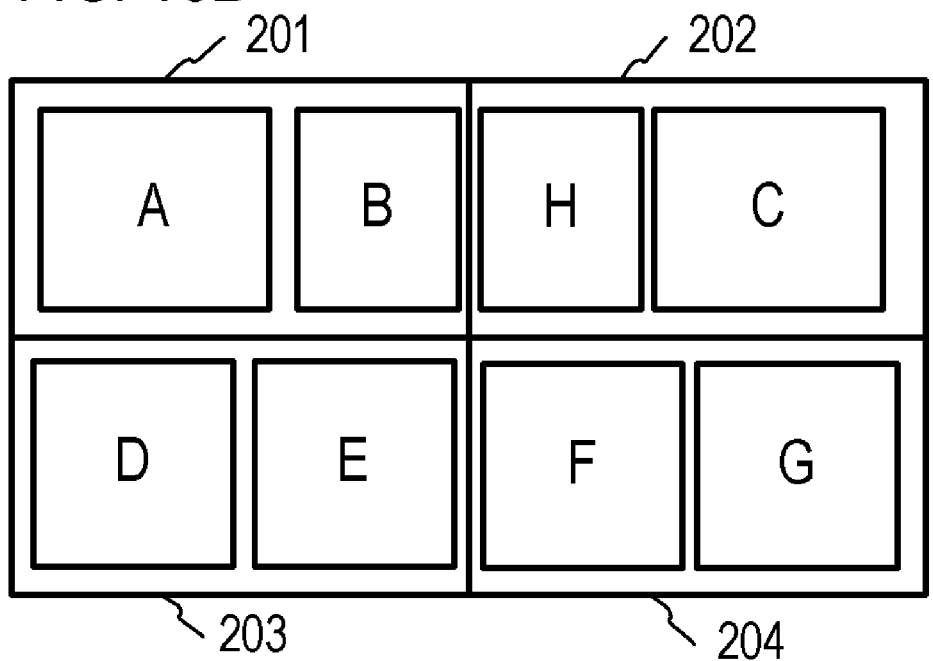

FIG. 13B shows a display example where a user operation of additionally displaying an image H, which is at least different from the types of images B and C, in the divided region 202 from the state of FIG. 13A is performed.

Here, in step S1002, when the image display control unit 102 performs processing according to the user operation, it determines that the arrangement of the images exceeds the image quality adjustment capability of the connected monitor since three types of images are contained in the divided region 202.

In addition, in step S1003, the image display control unit 102 changes the display position and display size of the image B so that the image B is displayed only in the divided region 201. Consequently, the number of types of images to be displayed in each divided region will be two, and image quality adjustment processing can be performed to all images in parallel.

In step S1004, the image display control unit 102 updates the image quality adjustment status management table and the image arrangement information management table based on the user operation or the change result in step S1003.

In addition, in step S1005, the image display control unit 102 decodes the image to be displayed and outputs the decoded image and its display position information to the display position control unit 103. Moreover, the image display control unit 102 outputs the image identifying information and the display position information to the connected monitor control unit 105. The display position control unit 103 generates an output image in which the input image is arranged at a position that is represented in the display position information, and outputs the output image to the display apparatus. The connected monitor control unit 105 outputs the image identifying information and the display position information to the monitor control unit 114. Consequently, all images to be displayed are displayed as a result of the appropriate image quality adjustment processing being applied in the connected monitor.

As described above, according to this embodiment, it is possible to maximize the capability of the display apparatus and perform the image quality adjustment processing in parallel to all images to be displayed without placing any burden on the user as with Embodiment 1.

Embodiment 3

In Embodiment 2, there was no particular limitation in the image quality adjustment processing that can be performed by one image processing unit in parallel. In other words, regardless of the type of combination of images to be displayed in one divided region, the image processing unit corresponding to that divided region was able to perform image quality adjustment processing to those images in parallel.

Nevertheless, in order for one image processing unit to perform γ conversion processing differently for each of the plurality of types of images, that image processing unit needs to include a plurality of γ conversion processing blocks for executing the γ conversion processing. Moreover, in order for one image processing unit to perform color conversion processing differently for each of the plurality of types of images, that image processing unit needs to include a plurality of color conversion processing blocks for executing the color conversion processing. With a configuration where one image processing unit includes a plurality of processing blocks for performing image processing for each type of image processing, the circuit size and cost of hardware will increase.

However, depending on the type of image, there are image processing that does not need to be applied. For example, while both the γ conversion processing and the color conversion processing need to be applied to color images, the color conversion processing does not need to be applied to monochrome images. Thus, as the configuration of the image processing unit, considered may be a configuration of including a different number of processing blocks for each type of image processing. For example, as the configuration of the image processing unit, considered may be a configuration of including two γ conversion processing blocks and one color conversion processing block. In the case of the foregoing configuration, there will be a limit in the combination of the types of images in which one image processing unit can perform the image quality adjustment processing in parallel.

This embodiment explains a case where there is a limit to the combination (performable combination) of types in which one image processing unit can perform the image quality adjustment processing in parallel.

Note that, since the configuration of the image output apparatus and the display apparatus according to Embodiment 3 is the same as the configuration of Embodiment 1 (FIG. 1), the explanation thereof is omitted.

The processing flow of the image output apparatus upon starting the image display is explained with reference to FIG. 5.

Foremost, in step S601, the image display control unit 102 acquires the image quality adjustment capability information of the connected monitor from the connected monitor information management unit 104.

In this embodiment, the image quality adjustment capability information includes information representing each divided region, and information representing the performable combination of each image processing unit. Specifically, the image quality adjustment capability information includes limit information of each image processing unit other than the information shown in FIG. 11.

FIG. 14 shows an example of the limit information according to this embodiment. FIG. 14 shows that, of the two types of images in which each image processing unit can perform image quality adjustment processing in parallel, the γ conversion processing, the color temperature conversion processing, and the color conversion processing can be performed to one image (first image), and the γ conversion processing and the color temperature conversion processing can be performed to the other image (second image). In other words, FIG. 14 shows that the color conversion processing can only be performed to one type of image. The type of image processing to be applied is determined based on the type of image. In other words, the limit information represents the combination of types that can be performed by each image processing unit.

Since the processing of step S602 onward is the same as Embodiment 2, the explanation thereof is omitted.

The processing flow during the image display operation is explained with reference to FIG. 9A.

Foremost, in step S1001, the image display control unit 102 determines whether the number of types of the selected images (images to be displayed) is not greater than the maximum adjustable number of the connected monitor. If the number of types of images to be displayed is not greater than the maximum adjustable number of the connected monitor (step S1001: Yes), the routine proceeds to step S1002. If the number of types of images to be displayed is greater than the maximum adjustable number of the connected monitor (step S1001: No), the routine proceeds to step S1006.

However, as shown in FIG. 14, one image processing unit can only apply the color conversion processing to one type of image. Thus, the maximum adjustable number of the connected monitor depends on the type of image. Specifically, for types that require color conversion processing, the maximum adjustable number of the image processing unit is one, and the maximum adjustable number of the connected monitor is 4 (=4 (number of image processing units)×1 (maximum adjustable number of each image processing unit)). For other images, the maximum adjustable number of the connected monitor will be 8 (=4×2). Thus, in this embodiment, the image display control unit 102 compares the type of selected image and the type of image on which each image processing unit can perform image quality adjustment processing in parallel, and determines whether the number of types of the selected images is greater than the maximum adjustable number of the connected monitor.

The processing of step S1001 is now explained in detail.

The image display control unit 102 uses the determination table of FIG. 15 and determines the maximum adjustable number of the connected monitor (maximum adjustable number of each image processing unit).

The determination table is a table including the type of image, and the type of image processing that needs to be applied to that type of image. In the example of FIG. 15, the determination table shows that the γ conversion processing and the color temperature conversion processing need to be performed to monochrome images, the γ conversion processing, the color temperature conversion processing, and the color conversion processing need to be performed to color images, and the γ conversion processing needs to be performed to other images. A monochrome image is, for example, a monochrome medical image or a monochrome photo image. A color image is, for example, a color medical image or a color photo image. Another image is, for example, a text image.

In other words, the limit information of FIG. 14 shows that one image processing unit can perform image quality adjustment processing to one type of image among monochrome images, color images, and other images. Moreover, the limit information of FIG. 14 shows that one image processing unit can perform, in parallel, the image quality adjustment processing to two types of monochrome images, two types of other images, one type of color image and one type of monochrome image or other images.

The image display control unit 102 uses the image quality adjustment capability information (FIG. 11 and FIG. 14) and the determination table (FIG. 15) and calculates the maximum adjustable number of the connected monitor.

For example, with respect to monochrome images, the maximum adjustable number of the connected monitor is calculated as eight. Specifically, from FIG. 15, it is determined that the γ conversion processing and the color temperature conversion processing are the image processing required for the monochrome images. In addition, from FIG. 14, it is determined that the γ conversion processing and the color temperature conversion processing can be respectively performed in parallel to two types of images. Based on the foregoing determination results, the maximum adjustable number of each image processing unit is determined as two, and the maximum adjustable number of the connected monitor is calculated as eight.

With respect to color images, the maximum adjustable number of the connected monitor is calculated as four. Specifically, from FIG. 15, it is determined that the γ conversion processing, the color temperature conversion processing and the color conversion processing are the image processing required for the color images. In addition, from FIG. 14, it is determined that the color conversion processing can be performed to one type of image each time. Based on the foregoing determination results, the maximum adjustable number of each image processing unit is determined as one, and the maximum adjustable number of the connected monitor is calculated as four.

In addition, the image display control unit 102 determines whether the number of types of images to be displayed is not greater than the maximum adjustable number of the connected monitor. Specifically, the image display control unit 102 determines whether the number of types of images to be displayed is eight or less, and determines whether the number of types of color images to be displayed is four or less. When the number of types of images to be displayed is eight or less, and the number of types of color images to be displayed is four or less, the image display control unit 102 determines that the number of types of images to be displayed is not greater than the maximum adjustable number of the connected monitor. Note that the image display control unit 102 may further determine whether the number of types of monochrome images to be displayed and the number of other types of images are eight or less.

In step S1006, the image display control unit 102 treats the user operation as an error, and cancels the selection processing of the image according to that user operation. In addition, the image display control unit 102 creates a message image to the effect that the number of types of images to be displayed exceeds the image quality adjustment capability of the connected monitor, and outputs the message image to the display apparatus 106 via the display position control unit 103. Consequently, the foregoing message image is displayed on the display apparatus 106, and the fact that the number of types of images to be displayed exceeds the image quality adjustment capability of the connected monitor is notified to the user.

In step S1002, the image display control unit 102 determines whether the arrangement of the images is set so that the combination of images to be displayed in one divided region is a performable combination of the image processing unit corresponding to that divided region. Specifically, whether the number of types of images to be displayed in one divided region is two or less and whether the number of types of color images to be displayed in one divided region is one or less are determined. The image display control unit 102 determines that the combination of images to be displayed in the divided region is a performable combination when the number of types of images to be displayed in one divided region is two or less and the number of types of color images to be displayed in one divided region is one or less.

If the combination of images to be displayed in one divided region is a performable combination of the image processing unit corresponding to that divided region (step S1002: Yes), the routine proceeds to step S1004. If the combination of images to be displayed in one divided region is not a performable combination of the image processing unit corresponding to that divided region (step S1002: No), the routine proceeds to step S1003.

In step S1003, the image display control unit 102 changes either the display size or the display position, or both of the display size and the display position of the image that was set so that the combination of images to be displayed in each divided region becomes a performable combination of the image processing unit corresponding to that divided region. The routine thereafter proceeds to step S1004.

In step S1004, the image display control unit 102 updates the image quality adjustment status management table and the image arrangement information management table based on the user operation or the change result in step S1003.

In addition, in step S1005, the image display control unit 102 decodes the image to be displayed and outputs the decoded image and its display position information to the display position control unit 103. Moreover, the image display control unit 102 outputs the image identifying information and the display position information to the connected monitor control unit 105. The display position control unit 103 generates an output image in which the input image is arranged at a position that is represented in the display position information, and outputs the output image to the display apparatus. The connected monitor control unit 105 outputs the image identifying information and the display position information to the monitor control unit 114. Consequently, all images to be displayed are displayed as a result of the appropriate image quality adjustment processing being applied in the connected monitor.

As described above, according to this embodiment, even when there is a limit in the performable combination of one image processing unit, it is possible to maximize the capability of the display apparatus and perform the image quality adjustment processing in parallel to all images to be displayed without placing any burden on the user.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., non-transitory computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-114892, filed on May 23, 2011, and Japanese Patent Application No. 2012-060462, filed on Mar. 16, 2012, which are hereby incorporated by reference herein in their entirety.

What is claimed is:

1. An image output apparatus for outputting images to a display apparatus having a plurality of image processing units respectively corresponding to a plurality of divided regions of a screen, comprising:
    a selecting unit that selects images to be output to the display apparatus;
    a setting unit that sets, according to a user operation, an arrangement of the selected images to be output to the display apparatus; and
    a control unit that determines whether the number of types of images arranged by the setting unit in one divided region is greater than a maximum adjustable number, which is the number of types of images on which the image processing unit corresponding to the divided region can perform image quality adjustment processing in parallel, and in a case where it is determined that the number of types of images arranged in one divided region is greater than the maximum adjustable number of the image processing unit corresponding to the divided region, changes at least one of a display size and a display position of the images to be output to the display apparatus so that the number of types of images displayed in the divided region is not greater than the maximum adjustable number, wherein
    each of the plurality of image processing units performs image quality adjustment processing on each image to be displayed in the divided region corresponding to the image processing unit among the plurality of divided regions,
    the control unit compares the types of images arranged by the setting unit and a combination of types of images on which each image processing unit can perform image quality adjustment processing in parallel, to determine whether the number of types of images arranged by the setting unit is greater than the maximum adjustable number, and
    the control unit gives a first notice in a case where the number of types of images arranged in one divided region is greater than the maximum adjustable number of the image processing unit corresponding to the divided region, and gives a second notice in a case where the number of types of images selected by the selecting unit is greater than a sum of the plurality of maximum adjustable numbers respectively corresponding to the plurality of image processing units.

2. The image output apparatus according to claim 1, wherein, in a case where a combination of a plurality of images displayed in one divided region is different from a combination of types of images on which the image processing unit corresponding to the divided region can perform image quality adjustment processing in parallel, the control unit changes at least one of the display size and the display position of the images to be output to the display apparatus so that the combination of images displayed in each divided region becomes the combination of types of images on which the image processing unit corresponding to the divided region can perform image quality adjustment processing in parallel.

3. The image output apparatus according to claim 2, further comprising:
    an acquisition unit that acquires, from the display apparatus, image quality adjustment capability information including information representing each divided region, and information representing a combination of types of images on which each image processing unit can perform image quality adjustment processing in parallel.

4. The image output apparatus according to claim 1, further comprising:
    an acquisition unit that acquires, from the display apparatus, image quality adjustment capability information including the maximum adjustable number of each image processing unit.

5. The image output apparatus according to claim 1, further comprising:
    an acquisition unit that acquires, from the display apparatus, image quality adjustment capability information including information representing each divided region and the maximum adjustable number of each image processing unit.

6. An image output apparatus for outputting images to a display unit, comprising:
    a plurality of image processing units respectively corresponding to a plurality of divided regions of a screen;
    a selecting unit that selects images to be output to the display unit;
    a setting unit that sets, according to a user operation, an arrangement of the selected images to be output to the display unit; and
    a control unit that determines whether the number of types of images arranged by the setting unit in one divided region is greater than a maximum adjustable number, which is the number of types of images on which the image processing unit corresponding to the divided region can perform image quality adjustment processing in parallel, and in a case where it is determined that the number of types of images arranged in one divided region is greater than the maximum adjustable number of the image processing unit corresponding to the divided region, changes at least one of a display size and a display position of the images to be output to the display unit so that the number of types of images displayed in the divided region is not greater than the maximum adjustable number, wherein each of the plurality of image processing units performs image quality adjustment processing on each image to be displayed in the divided region corresponding to the image processing unit among the plurality of divided regions, the control unit compares the types of images arranged by the setting unit and a combination of types of images on which each image processing unit can perform image quality adjustment processing in parallel, to determine whether the number of types of images arranged by the setting unit is greater than the maximum adjustable number, and the control unit gives a first notice in a case where the number of types of images arranged in one divided region is greater than the maximum adjustable number of the image processing unit corresponding to the divided region, and gives a second notice in a case where the number of types of images selected by the selecting unit is greater than a sum of the plurality of maximum adjustable numbers respectively corresponding to the plurality of image processing units.

7. The image output apparatus according to claim 6, wherein, in a case where a combination of a plurality of images displayed in one divided region is different from a combination of types of images on which the image processing unit corresponding to the divided region can perform image quality adjustment processing in parallel, the control unit changes at least one of the display size and the display position of the images to be output to the display unit so that the combination of images displayed in each divided region becomes the combination of types of images on which the image processing unit corresponding to the divided region can perform image quality adjustment processing in parallel.

8. A control method for an image output apparatus for outputting images to a display apparatus having a plurality of image processing units respectively corresponding to a plurality of divided regions of a screen, comprising:

a selecting step of selecting images to be output to the display apparatus;

a setting step of setting, according to a user operation, an arrangement of the selected images to be output to the display apparatus; and a control step of determining whether the number of types of images arranged in the setting step in one divided region is greater than a maximum adjustable number, which is the number of types of images on which the image processing unit corresponding to the divided region can perform image quality adjustment processing in parallel, and in a case where it is determined that the number of types of images arranged in one divided region is greater than the maximum adjustable number of the image processing unit corresponding to the divided region, changing at least one of a display size and a display position of the images to be output to the display apparatus so that the number of types of images displayed in the divided region is not greater than the maximum adjustable number, wherein each of the plurality of image processing units performs image quality adjustment processing on each image to be displayed in the divided region corresponding to the image processing unit among the plurality of divided regions, in the control step, the types of images arranged in the setting step and a combination of types of images on which each image processing unit can perform image quality adjustment processing in parallel are compared to determine whether the number of types of images arranged in the setting step is greater than the maximum adjustable number, and in the control step, a first notice is given in a case where the number of types of images arranged in one divided region is greater than the maximum adjustable number of the image processing unit corresponding to the divided region, and a second notice is given in a case where the number of types of images selected in the selecting step is greater than a sum of the plurality of maximum adjustable numbers respectively corresponding to the plurality of image processing units.

9. A control method for an image output apparatus having a plurality of image processing units respectively corresponding to a plurality of divided regions of a screen, comprising:

a selecting step of selecting images to be output to a display unit;

a setting step of setting, according to a user operation, an arrangement of the selected images to be output to a display unit; and a control step of determining whether the number of types of images arranged in the setting step in one divided region is greater than a maximum adjustable number, which is the number of types of images on which the image processing unit corresponding to the divided region can perform image quality adjustment processing in parallel, and in a case where it is determined that the number of types of images arranged in one divided region is greater than the maximum adjustable number of the image processing unit corresponding to the divided region, changing at least one of a display size and a display position of the images to be output to the display unit so that the number of types of images displayed in the divided region is not greater than the maximum adjustable number, wherein each of the plurality of image processing units performs image quality adjustment processing on each image to be displayed in the divided region corresponding to the image processing unit among the plurality of divided regions, in the control step, the types of images arranged in the setting step and a combination of types of images on which each image processing unit can perform image quality adjustment processing in parallel are compared to determine whether the number of types of images arranged in the setting step is greater than the maximum adjustable number, and in the control step, a first notice is given in a case where the number of types of images arranged in one divided region is greater than the maximum adjustable number of the image processing unit corresponding to the divided region, and a second notice is given in a case where the number of types of images selected in the selecting step is greater than a sum of the plurality of maximum adjustable numbers respectively corresponding to the plurality of image processing units.

10. An image output apparatus for outputting images to a display apparatus having a plurality of image processing units respectively corresponding to a plurality of divided regions of a screen, comprising:

a selecting unit that selects images to be output to the display apparatus;

a setting unit that sets, according to a user operation, an arrangement of the selected images to be output to the display apparatus; and a control unit that determines whether the number of types of images selected by the selecting unit is greater than a sum of a plurality of maximum adjustable numbers respectively corresponding to the plurality of image processing units, wherein each of the plurality of image processing units performs image quality adjustment processing on each image to be displayed in the divided region corresponding to the image processing unit among the plurality of divided regions, the maximum adjustable number is the number of types of images on which the image processing unit corresponding to the divided region can perform image quality adjustment processing in parallel, the control unit compares the types of images selected by the selecting unit and a combination of types of images on which the plurality of image processing units can perform image quality adjustment processing in parallel, to determine whether the number of types of images selected by the selecting unit is greater than the sum of the plurality of maximum adjustable numbers respectively corresponding to the plurality of image processing units, and the control unit gives a first notice in a case where the number of types of images arranged in one divided region is greater than the maximum adiustable number of the image processing unit corresponding to the divided region, and gives a second notice in a case where the number of types of images selected by the selecting unit is greater than the sum of the plurality of maximum adjustable numbers respectively corresponding to the plurality of image processing units.

11. The image output apparatus according to claim 10, wherein, in a case where a combination of a plurality of images displayed in one divided region is different from a combination of types of images on which the image processing unit corresponding to the divided region can perform image quality adjustment processing in parallel, the control unit changes at least one of the display size and the display position of the images to be output to the display apparatus so that the combination of images displayed in each divided region becomes the combination of types of images on which the image processing unit corresponding to the divided region can perform image quality adjustment processing in parallel.

12. An image output apparatus for outputting images to a display unit, comprising:

a plurality of image processing units respectively corresponding to a plurality of divided regions of a screen a selecting unit that selects images to be output to the display unit;

a setting unit that sets, according to a user operation, an arrangement of the selected images to be output to the display unit; and a control unit that determines whether the number of types of images selected by the selecting unit is greater than a sum of a plurality of maximum adjustable numbers respectively corresponding to the plurality of image processing units, wherein each of the plurality of image processing units performs image quality adjustment processing on each image to be displayed in the divided region corresponding to the image processing unit among the plurality of divided regions, the maximum adjustable number is the number of types of images on which the image processing unit corresponding to the divided region can perform image quality adjustment processing in parallel, the control unit compares the types of images selected by the selecting unit and a combination of types of images on which the plurality of image processing units can perform image quality adjustment processing in parallel, to determine whether the number of types of images selected by the selecting unit is greater than the sum of the plurality of maximum adjustable numbers respectively corresponding to the plurality of image processing units, and the control unit gives a first notice in a case where the number of types of images arranged in one divided region is greater than the maximum adiustable number of the image processing unit corresponding to the divided region, and gives a second notice in a case where the number of types of images selected by the selecting unit is greater than the sum of the plurality of maximum adjustable numbers respectively corresponding to the plurality of image processing units.

13. The image output apparatus according to claim 12, wherein, in a case where a combination of a plurality of images displayed in one divided region is different from a combination of types of images on which the image processing unit corresponding to the divided region can perform image quality adjustment processing in parallel, the control unit changes at least one of the display size and the display position of the images to be output to the display unit so that the combination of images displayed in each divided region becomes the combination of types of images on which the image processing unit corresponding to the divided region can perform image quality adjustment processing in parallel.

* * * * *